(12) United States Patent
Sun et al.

(10) Patent No.: US 7,751,170 B2
(45) Date of Patent: Jul. 6, 2010

(54) CHARGE MANAGEMENT OF ELECTRICALLY ISOLATED OBJECTS VIA MODULATED PHOTOELECTRIC CHARGE TRANSFER

(75) Inventors: Ke-Xun Sun, Stanford, CA (US); Brett A. Allard, Mountain View, CA (US); Robert L. Byer, Stanford, CA (US); Saps Buchman, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 503 days.

(21) Appl. No.: 11/809,553

(22) Filed: Jun. 1, 2007

(65) Prior Publication Data
US 2008/0043397 A1 Feb. 21, 2008

Related U.S. Application Data

(60) Provisional application No. 60/810,614, filed on Jun. 2, 2006.

(51) Int. Cl.
*H05F 3/06* (2006.01)
*H05F 3/00* (2006.01)
(52) U.S. Cl. .................................... 361/212
(58) Field of Classification Search .............. 361/212
See application file for complete search history.

(56) References Cited

U.S. PATENT DOCUMENTS

| | | | |
|---|---|---|---|
| 5,254,229 A | 10/1993 | Ohmi et al. | |
| 5,606,398 A * | 2/1997 | Ender | 399/168 |
| 5,621,605 A | 4/1997 | Inaba et al. | |
| 5,898,268 A | 4/1999 | Moreshead et al. | |
| 6,545,853 B1 | 4/2003 | Gelderloos et al. | |
| 6,803,960 B2 * | 10/2004 | Shepherd et al. | 348/315 |
| 7,539,429 B2 * | 5/2009 | Shimizu | 399/49 |
| 2001/0043274 A1 * | 11/2001 | Shepherd et al. | 348/241 |
| 2004/0027777 A1 | 2/2004 | Komoriya et al. | |

* cited by examiner

*Primary Examiner*—Ronald W Leja
(74) *Attorney, Agent, or Firm*—Lumen Patent Firm

(57) ABSTRACT

Charge transfer is provided to or from an electrically isolated test body by AC modulation of the photoelectric effect. More specifically, a reference body is disposed near the test body without physical contact between the reference and test bodies. Facing surfaces of the reference and test bodies are illuminated by optical radiation having a sufficiently short wavelength that charged particles are emitted from the reference and test bodies. An electrical bias is established between the reference body and the test body. Both the optical radiation and the electrical bias are modulated at the same frequency. A magnitude and direction of a charge transfer rate between the reference and test bodies is set by selecting a phase relation between the optical radiation and the electrical bias.

18 Claims, 4 Drawing Sheets

CHARGE MANAGEMENT OF ELECTRICALLY ISOLATED OBJECTS VIA MODULATED PHOTOELECTRIC CHARGE TRANSFER

CROSS REFERENCE TO RELATED APPLICATIONS

This application claims the benefit of U.S. provisional patent application 60/810,614, filed on Jun. 2, 2006, entitled "LED Deep UV Source for Charge Management", and hereby incorporated by reference in its entirety.

FIELD OF THE INVENTION

This invention relates to providing charge transfer to or from an electrically isolated object.

BACKGROUND

Space based gravitational wave sensors rely on position measurements of proof masses to sense gravitational waves. Since the effects of gravitational Waves are extraordinarily small, it is important to minimize all other forces on the proof masses. Accumulation of a net electric charge on a proof mass can result in spurious forces on the proof mass (e.g., a Lorentz force from motion through the interplanetary magnetic field, and/or electrostatic forces from other bodies with a net or induced charge). Accordingly, proof mass charge management to eliminate net electric charge on the proof mass is important. The standard approach for performing proof mass charge management relies on the photoelectric effect induced by UV radiation from a UV source. Present instrument designs employ Hg lamps in the UV source.

However, this approach for proof mass charge management is unsatisfactory in several respects. First, Hg lamps are: physically large, mechanically fragile, sensitive to temperature variations, significant sources of EMI and RFI, and consume a large amount of power in operation, all of which are highly undesirable in space applications.

Second, it can be difficult to obtain the dynamic range required in practice. For example, in one space mission, the nominal discharge rate is on the order of 10s to 100s of electrons/s, but discharge rates on the order of 1 to 10 million electrons/s can be required after initial release of the proof mass or after it makes contact with another object. Since Hg lamps typically have a dynamic range on the order of 10-100, several lamps having varying output power ranges may need to be included in the UV source to cover a mission dynamic range of about 100,000. The use of several lamps in the UV source further increases the above-identified problems associated with Hg lamps.

The photoelectric effect has also been employed for charge management in connection with other applications. For example, in U.S. Pat. No. 6,545,853, the photoelectric effect is exploited to provide a spacecraft ground. In U.S. Pat. No. 5,898,268, the photoelectric effect is exploited to provide neutralization of accumulated positive charge on a semiconductor wafer by illuminating a photocathode disposed near the wafer.

Another example of charge management is considered in US 2004/0027777, where UV light emitting diodes are employed for eliminating static electricity from a target via emission of photoelectrons from the target and/or by ionization of gas molecule around the target.

However, these non-sensor applications of charge management do not appear to require a high dynamic range of the charge transfer rate. Accordingly, it would be an advance in the art to provide charge management having a high dynamic range.

SUMMARY

In embodiments of the invention, charge transfer is provided to or from an electrically isolated test body by AC modulation of the photoelectric effect. More specifically, a reference body is disposed near the test body without physical contact between the reference and test bodies. Facing surfaces of the reference and test bodies are illuminated by optical radiation having a sufficiently short wavelength that charged particles (e.g., electrons) are emitted from the reference and test bodies (e.g., via the photoelectric effect). An electrical bias is established between the reference body and the test body. Both the optical radiation and the electrical bias are modulated at the same frequency. A magnitude and direction of a charge transfer rate between the reference and test bodies is set by selecting a phase relation between the optical radiation and the electrical bias.

For example, if the radiation is on only during periods when the test body is at a positive potential relative to the reference body, electrons will be transferred to the test body. If the radiation is on only during periods when the test body is at a negative potential relative to the reference body, electrons will be removed from the test body. This phase relation can be adjusted during operation, e.g., in a closed loop charge control system.

Bi-directional charge management (i.e., either removing electrons from the test body or adding electrons to the test body) is an important capability provided by embodiments of the invention. Such bi-directional charge management is applicable independent of the charge state of the test body (i.e., the test body can be positively charged, negatively charged, or uncharged).

Embodiments of the invention can provide various advantages. High dynamic range can be provided by adjusting the phase relation between the optical radiation and the electrical bias. Further improvements to the dynamic range can be provided by altering other parameters of the electrical bias or optical radiation in addition to the relative phase, such as amplitude, duty cycle, pulse width, etc. Preferably, the source of the optical radiation is amenable to rapid direct modulation (e.g., a UV light emitting diode (LED), a UV laser source, a UV super-fluorescent source, or a laser source followed by a nonlinear conversion crystal).

Rapid modulation is valuable for sensor applications (e.g., where the test body is a proof mass for a space based gravitational wave sensor), since the modulation frequency can be selected to be out of the instrumentation bandwidth of the sensor, thereby desirably reducing the impact of charge control on sensor operation. Charge management with UV LED sources also provides significant size, weight, power and ruggedness advantages compared to conventional gas discharge lamp UV sources (e.g., Hg lamps). Replacing gas discharge lamps with UV LEDs also advantageously allows elimination of the lamp RF power supplies, which can be a significant source of electromagnetic interference (EMI) and RF interference (RFI).

Another advantageous feature of embodiments of the inventions is the use of an electrical bias to drive charge transfer. Application of a bias can greatly speed up the rate of charge transfer compared to cases where charge transfer is driven only by the static potential difference between the reference body and the test body. Application of a bias to drive charge transfer is more difficult in conventional approaches where the bias is not modulated or slowly modulated, since the resulting perturbation of the test body can adversely affect performance. For example, slow modulation can be undesirably "in-band" for a space-based gravitational wave sensor, and compensating for a static electrical bias can undesirably shift the operating point of a proof mass position control loop.

Applications of the invention include spacecraft proof mass charge management, local charge release from spacecraft parts such as windows, optical components, etc., semiconductor wafer processing, IC fabrication, and biomedical lab use.

Embodiments of the invention having UV LED sources can provide particularly compelling advantages in space-based gravitational wave sensor applications, compared to existing DC Hg lamp charge management approaches. Since Hg lamps have a slow turn-on time, any bias modulation in such systems has to be on a similar time scale. Unfortunately, these pseudo DC fields disturb the sensor in the middle of the science frequency band. In sharp contrast, embodiments of the invention can have bias modulation at frequencies orders of magnitude away from the science frequency band. Furthermore, in some cases signals that are already present in the system can act as the electrical bias signal, thereby reducing system complexity.

A further advantage of AC charge management with UV LEDs is the complete elimination of moving parts, since adjustment of charge transfer rates over a wide dynamic range can be provided by electronically altering parameters such as relative optical and bias phase. Such elimination of moving parts advantageously simplifies the system and can increase reliability. Continuous charge management can be enabled by the longer lifetime of UV LEDs compared to Hg lamps. The small size and power requirements for UV LED sources enables various configurations, such as the use of two charge transfer channels for redundancy and for differential and common mode measurements.

It is important to provide an accurate measurement of the test body potential relative to the reference body. Conventional approaches based on DC measurements with an Hg lamp provide results accurate to a few mV. Measurements based on a modulated UV LED approach should provide accuracy on the order of a few µV, which is about a 1000-fold improvement in accuracy.

Verification and updating of the capacitance model for capacitance between the proof mass and nearby structures is also important for sensor operation. With AC charge management, the proof mass potential can be varied at frequencies the capacitive sensing electronics can detect. The amplitude of the potential detected at each electrode is directly related to the capacitance of each electrode to the proof mass. The ratio of the amplitude measure from one electrode to the next directly relates to the ratio of the electrode capacitance, which can then be used to verify and update the capacitance model as needed.

AC change management can also be employed to verify the electrostatic disturbance model. The charge level of the proof mass can be controlled in a slow sinusoidal manner (e.g., 10 mHz to 100 mHz) which can allow the electrostatic terms to be decoupled from other disturbances such as thermal gradients, mass attraction, and magnetic fields.

DETAILED DESCRIPTION

Figure 1A:
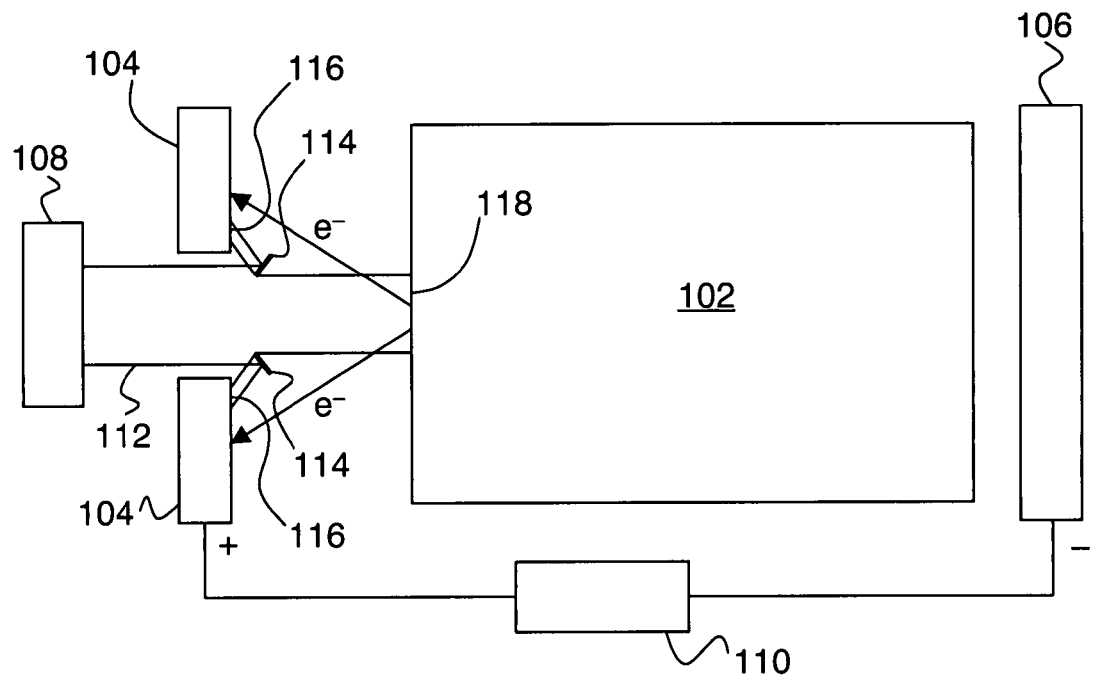
FIGS. 1a-b show operation of a charge transfer system according to an embodiment of the invention.
Figure 1B:
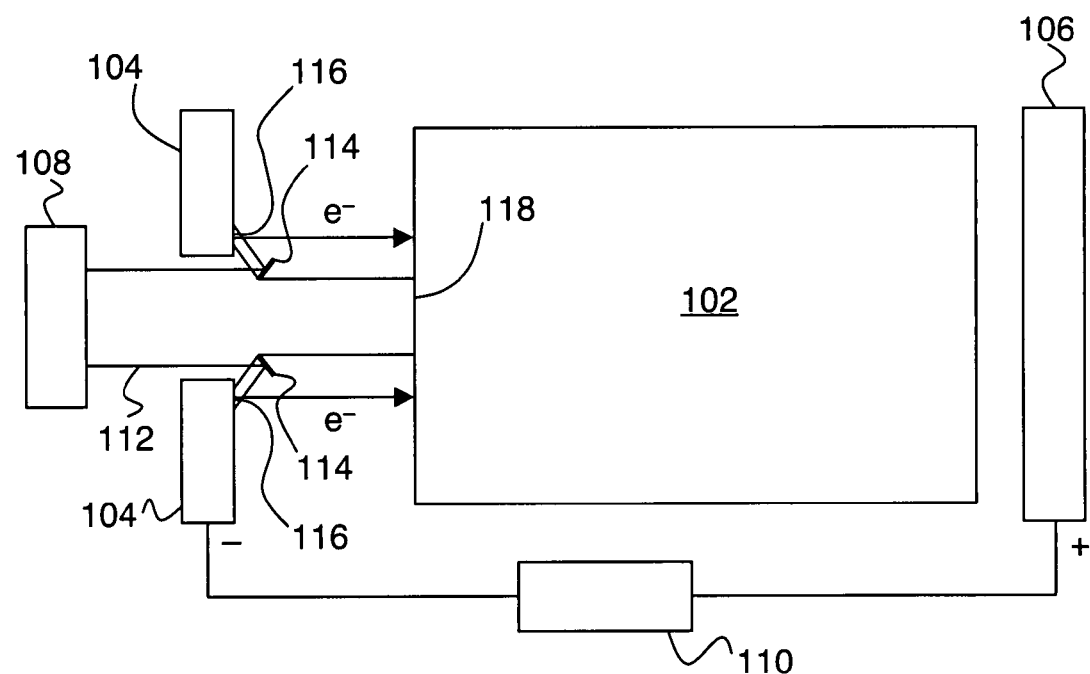

FIGS. 1a-b show operation of a charge transfer system according to an embodiment of the invention. On FIG. 1a, an electrically isolated test body 102 is disposed in proximity to a reference body 104. For example, test body 102 can be a proof mass for a space-based gravitational wave sensor. Bias circuitry 110 applies an electrical bias between test body 102 and reference body 104. In the example of FIG. 1a, this bias is provided by connecting bias circuitry 110 to reference body 104 and to a field electrode 106, where test body 102 is disposed between reference body 104 and field electrode 106, but does not make contact with either reference body 104 or field electrode 106. Bias circuitry 110 establishes a potential difference between reference body 104 and field electrode 106, which generates the bias between test body 102 and reference body 104 by capacitive coupling of test body 102 to reference body 104 and to field electrode 106. Any other method of generating an electrical bias between test body 102 and reference body 104 is also suitable for practicing the invention. The electrical bias between test body 102 and reference body 104 is modulated by modulating the signal applied to reference body 104 and field electrode 106. Such modulation is periodic, and can have any frequency or modulation waveform (e.g., sine wave, square wave, pulse train, triangle wave, etc.).

An optical source 108 provides a beam 112 of optical radiation to test body 102 and to reference body 104. In the example of FIG. 1a, beam 112 passes through a hole in reference body 104 to reach test body 102, and a fraction of beam 112 is directed to reference body 104 by an annular reflector 114. Any other method of illuminating facing surfaces of test body 102 and reference body 104 can also be used to practice the invention. For example, radiation reflected from test body 102 may provide sufficient illumination of reference body 104, without the use of a separate reflector 114. The intensity of beam 112 is modulated. The electrical bias modulation between test body 102 and reference body 104 is phase coherent with the modulation of beam 112. The relative phase of the bias modulation and the optical modulation is adjustable. As is well known in the art, such phase coherence also entails a definite relation between the optical and electrical modulation frequencies. These two frequencies can be the same, which is preferred, or the optical/electrical frequency ratio can be a ratio of small integers (e.g., 2/1, 1/2, 3/1, 1/3, 3/2, etc.). Methods for providing such phase coherence are well known in the art. In cases where test body 102 is part of a sensor (e.g., a space based gravitational wave sensor), it is preferred for the electrical bias modulation to be at a frequency that is out of the sensor bandwidth, so that the bias modulation does not affect sensor operation. It is also preferred for the optical modulation to be at a frequency that is out of the sensor bandwidth.

The wavelength or wavelength range of beam 112 is sufficiently short that electrons are emitted from illuminated surface 118 of test body 102 and from illuminated surface 116 of reference body 104 via the photoelectric effect. Surfaces 116 and 118 can be of any material that exhibits sufficient photoemission efficiency. Corrosion-resistant metal surfaces (e.g., Au) are typically preferred. Optical source 108 can be any source having sufficiently short wavelength to generate photoelectrons from test body 102 and reference body 104. For example, if test body 102 and reference body 104 are metal coated (e.g., Au coated), deep UV radiation (wavelength about 260 nm or shorter) is sufficiently short. Although any source meeting the wavelength condition can be employed in practicing the invention, UV light emitting diodes (LEDs) are preferred sources, since they have significant size, weight, power and ruggedness advantages compared to older UV source approaches such as Hg lamps. AlGaN LEDs have been developed which have sufficiently short wavelengths for this purpose. UV LEDs can also be more readily modulated than Hg lamps (e.g., by direct current modulation). Although direct modulation is preferred for simplicity, a continuous wave source can be combined with a modulator within optical source 108 to provide modulated beam 112.

Photoelectrons emitted from surface 116 of reference body 104 and from surface 118 of test body 102 will move between test body 102 and reference body 104 in response to the electrical bias between test body 102 and reference body 104. FIG. 1a shows a situation where reference body 104 is at a higher electric potential than test body 102 (positive bias). In this situation, electron flow will tend to be toward reference body 104 and away from test body 102, as shown. The electric charge of test body 102 will increase. More specifically, if test body 102 is positively charged, that positive charge will increase, and if test body 102 is negatively charged, that negative charge will decrease in magnitude. FIG. 1b shows a situation where reference body 104 is at a lower electric potential than test body 102 (negative bias). In this situation, electron flow will tend to be toward test body 102 and away from reference body 104, as shown. The electric charge of test body 102 will decrease. More specifically, if test body 102 is positively charged, that positive charge will decrease in magnitude, and if test body 102 is negatively charged, that negative charge will increase in magnitude.

The magnitude and direction of the charge transfer rate between test body 102 and reference body 104 depend on parameters of the modulated electrical bias and of the modulated optical radiation. These parameters include at least the relative phase between the optical modulation and the electrical bias modulation. Other parameters that can be selected to set the charge transfer rate include, but are not limited to: optical radiation duty cycle, electrical bias duty cycle, optical radiation modulation amplitude, electrical bias modulation amplitude, optical radiation amplitude, electrical bias amplitude, optical radiation pulse width, electrical bias pulse width, optical radiation modulation waveform, and electrical bias modulation waveform. The flexibility in setting the charge transfer rate by adjusting the phase, and optionally adjusting one or more of the additional parameters is especially valuable for increasing dynamic range, which can be regarded as a ratio of a maximum charge transfer rate magnitude to a minimum non-zero charge transfer rate magnitude.

In preferred embodiments of the invention, the dynamic range is preferably greater than about 10,000, and is more preferably greater than about 100,000. A significant advantage of embodiments of the invention is providing such high dynamic ranges, which can be required for certain demanding applications. UV LEDs can provide a dynamic range on the order of 1,000 to 10,000 by direct amplitude modulation. Further improvement of the dynamic range can be provided by adjusting modulation parameters such as relative phase, varying the pulse width, and selecting pulses from a longer pulse train.

Embodiments of the invention provide charge transfer to/from the test body, and such charge transfer can be performed either open loop or closed loop. Closed loop control is typically preferred in practice, where the parameters (e.g., phase relation between optical modulation electrical bias modulation) are controlled by a loop configured to hold a control variable to a predetermined range during operation. For example, the control variable could be electrical potential difference between test body and reference body, and the predetermined range could be a small range including zero. The resulting control loop can act to keep the test body and reference body at about the same potential by transferring charge to/from the test body as needed.

Figure 2:
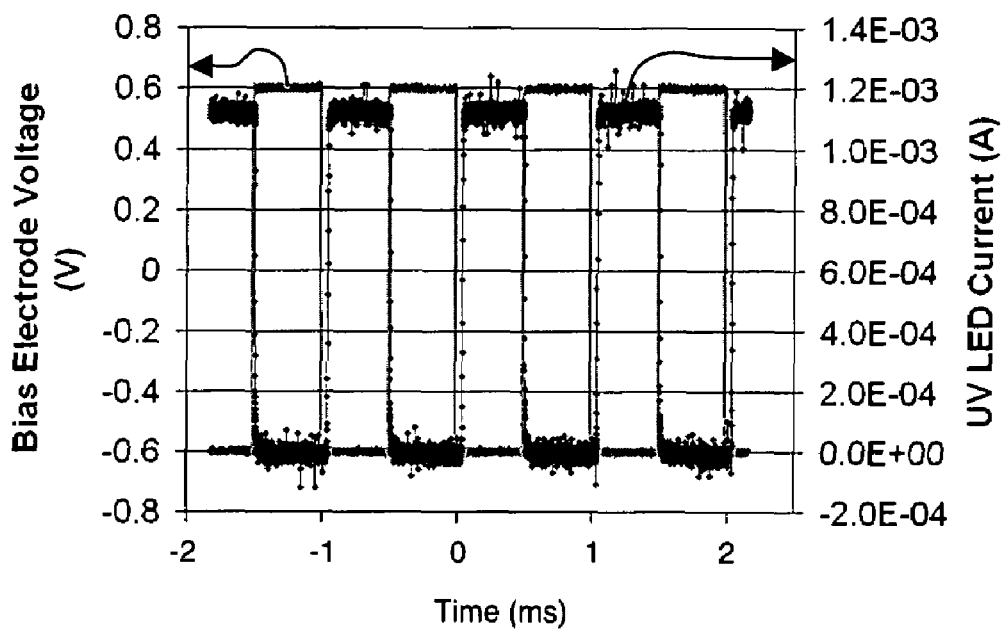
FIG. 2 shows an example where optical radiation modulation is out of phase with respect to the bias modulation in an embodiment of the invention.
Figure 3:
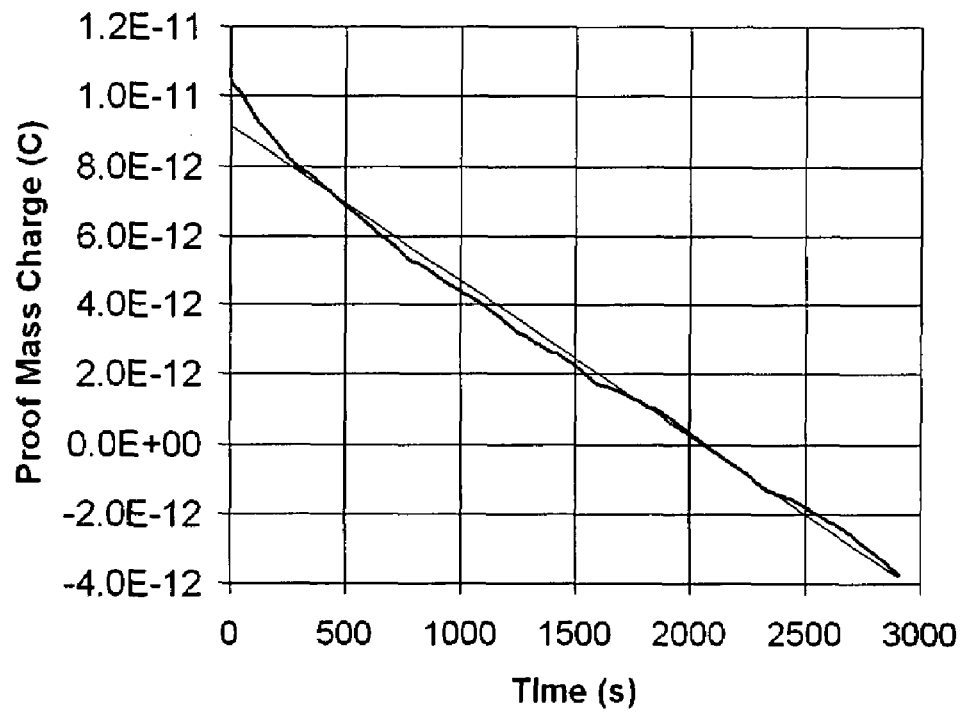
FIG. 3 shows proof mass charge vs. time for the example of FIG. 2.

FIG. 2 shows an example where optical radiation modulation is out of phase with respect to the bias modulation in an embodiment of the invention. FIG. 3 shows proof mass charge vs. time for the example of FIG. 2. In this experiment, the optical source was a 5 mW UV LED, the electrical bias was ±0.6 V, and the modulation frequency was 10 kHz for both the electrical bias and for the UV LED. FIG. 2 shows LED current (black, noisier trace) and bias voltage (gray, less noisy trace) waveforms. When the light is on, the bias voltage is negative, drawing electrons toward test body 102 (as on FIG. 1b). FIG. 3 shows the resulting decrease of proof mass charge as a function of time. An electrometer was employed for the charge measurement that did not have the bandwidth to directly measure the ~10 kHz modulation of the discharge rate.

Figure 4:
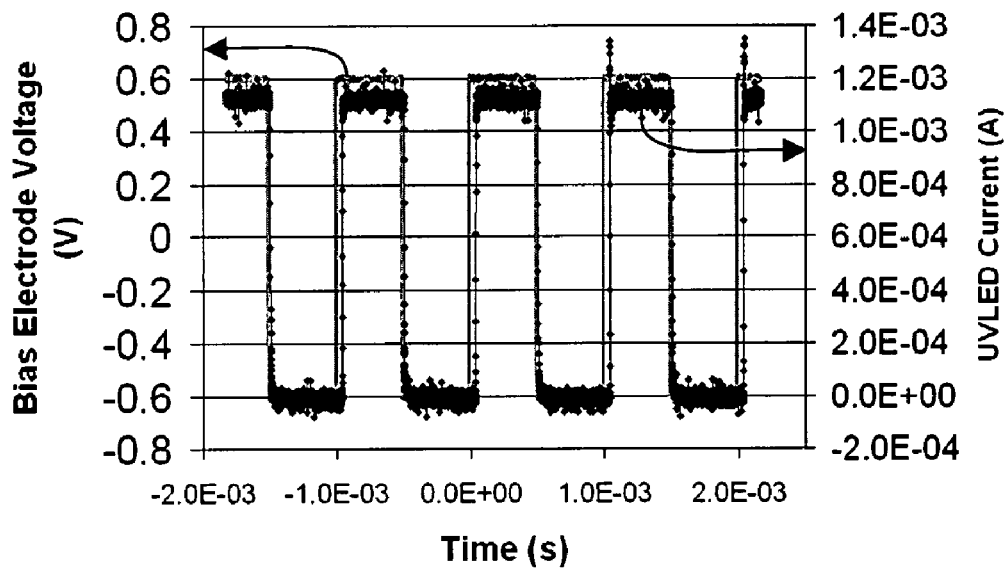
FIG. 4 shows an example where optical radiation modulation is in phase with respect to the bias modulation in an embodiment of the invention.
Figure 5:
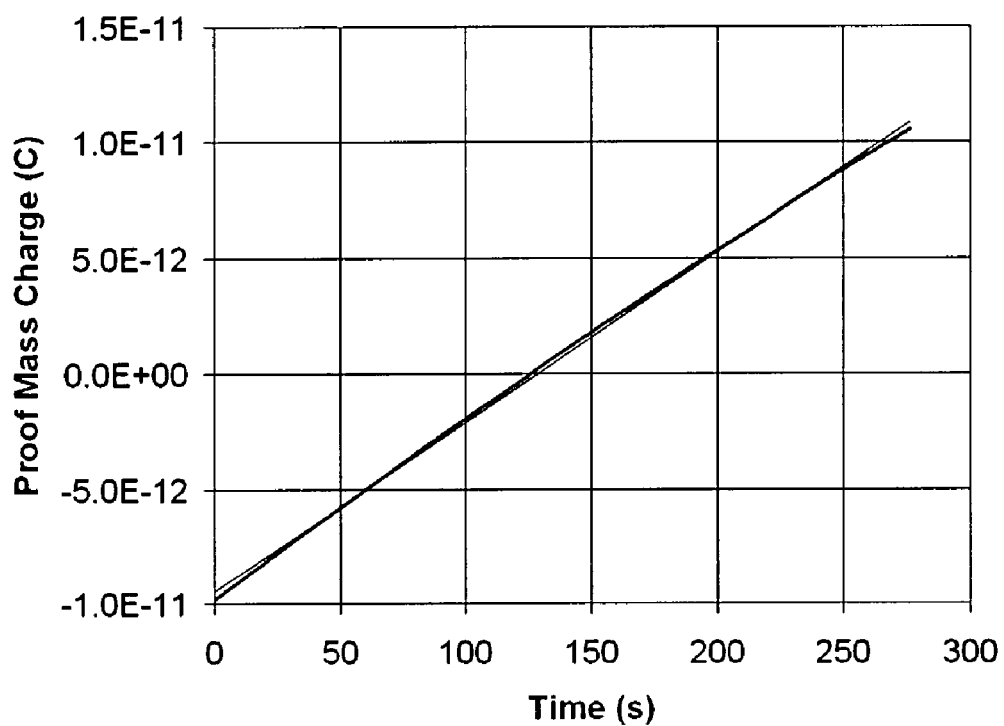
FIG. 5 shows proof mass charge vs. time for the example of FIG. 4.

FIG. 4 shows an example where optical radiation modulation is in phase with respect to the bias modulation in an embodiment of the invention. FIG. 5 shows proof mass charge vs. time for the example of FIG. 4. This example is similar to the example of FIGS. 2 and 3, except that the phase relation between the optical modulation and the bias modulation is altered such that the light is on when the bias voltage is positive, drawing electrons away from test body 102 (as on FIG. 1a). FIG. 5 shows the resulting increase of proof mass charge as a function of time.

Figure 6:
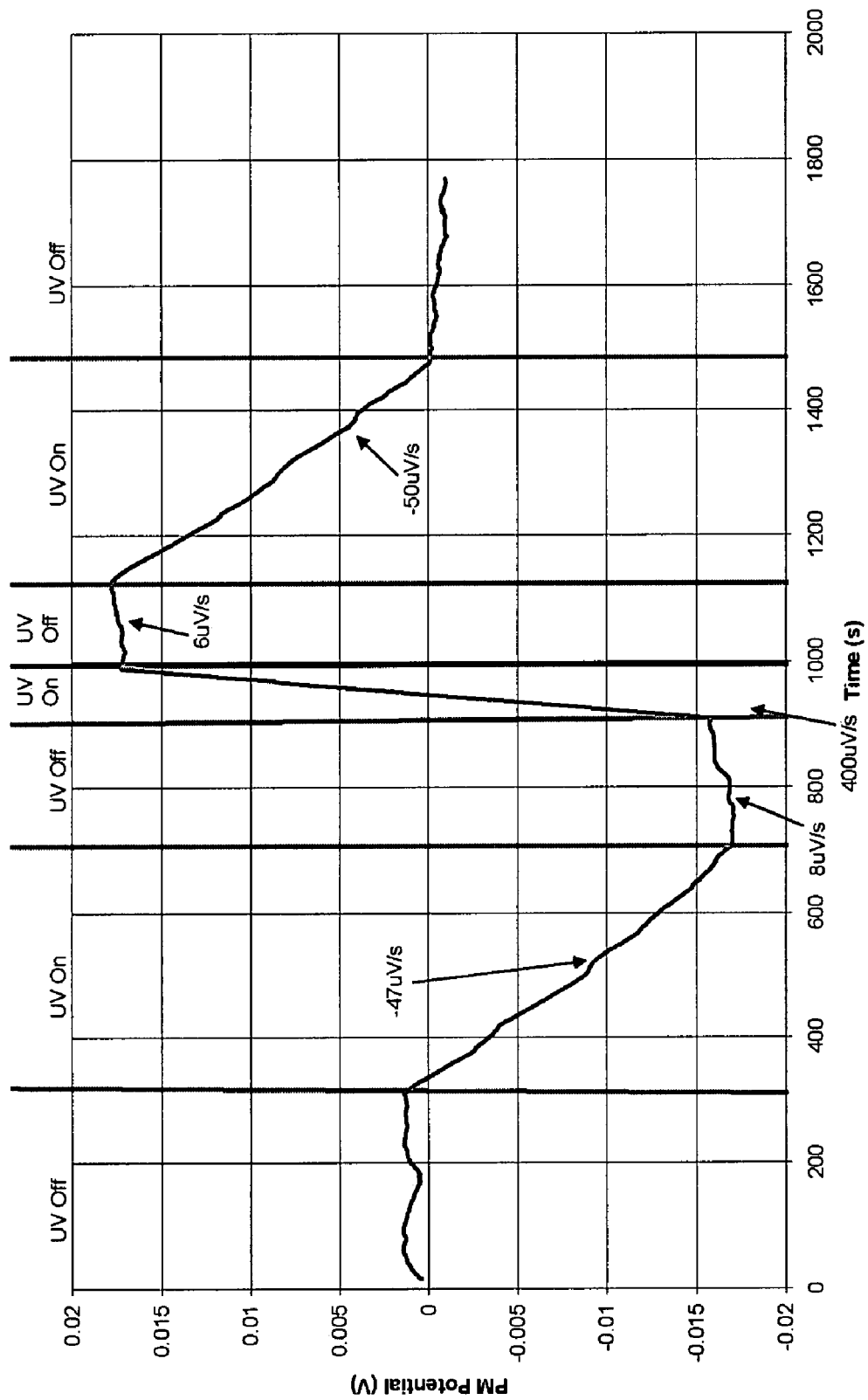
FIG. 6 shows an example of charge transfer according to an embodiment of the invention.

FIG. 6 shows an example of charge transfer according to an embodiment of the invention. In this example, several different charge transfer rates are experimentally demonstrated with a 1.2 mA UV LED modulated at 10 kHz with a 50% duty cycle.

The preceding description has been by way of example as opposed to limitation, and the invention can also be practiced according to many variations of the preceding embodiments. For example, charge management according to the invention can rely on emission of any kind of charged particle (electrons, ions, etc.) from surfaces of the test and reference bodies in response to illumination.

The invention claimed is:

1. A method for transferring charge to or from an electrically isolated test body, the method comprising:
  disposing a reference body in proximity to said test body;
  applying a modulated electrical bias between said test body and said reference body;
  illuminating said reference body and said test body with modulated optical radiation;
  wherein said modulation of said electrical bias and said modulation of said optical radiation are phase coherent;

wherein a wavelength of said optical radiation is sufficiently short that charged particles are emitted from surfaces of said test and reference bodies illuminated by said optical radiation;

wherein said emitted charged particles move between said reference body and said test body in response to said electrical bias;

wherein one or more parameters of said modulated electrical bias and of said modulated optical radiation are selected to set a magnitude and direction of a charge transfer rate between said test body and said reference body;

wherein said parameters include a phase relation between said electrical bias and said optical radiation.

2. The method of claim 1, wherein a ratio of a maximum charge transfer rate magnitude to a minimum non-zero charge transfer rate magnitude is greater than about 10,000.

3. The method of claim 1, wherein said parameters further include one or more parameters selected from the group consisting of: optical radiation duty cycle, electrical bias duty cycle, optical radiation modulation amplitude, electrical bias modulation amplitude, optical radiation amplitude, electrical bias amplitude, optical radiation pulse width, electrical bias pulse width, optical radiation modulation waveform, and electrical bias modulation waveform.

4. The method of claim 1, wherein said phase relation is adjusted during operation to alter said charge transfer rate.

5. The method of claim 4, further comprising controlling said phase relation with a control loop in order to hold a control variable to a predetermined range during operation.

6. The method of claim 5, wherein said control variable is an electrical potential difference between said test body and said reference body, and wherein said predetermined range includes zero.

7. The method of claim 1, wherein said electrical bias and said optical radiation are modulated at substantially the same modulation frequency.

8. The method of claim 1, wherein said charged particles comprise electrons, and wherein emission of said electrons from said illuminated surfaces of said reference body and said test body is via the photoelectric effect.

9. A system for transferring charge to or from an electrically isolated test body, the system comprising:
a reference body disposed in proximity to said test body;
bias circuitry for applying a modulated electrical bias between said test body and said reference body;
an optical source for illuminating said reference body and said test body with modulated optical radiation;
wherein said modulation of said electrical bias and said modulation of said optical radiation are phase coherent;
wherein a wavelength of said optical radiation is sufficiently short that charged particles are emitted from surfaces of said test and reference bodies illuminated by said optical radiation;

wherein said emitted charged particles move between said reference body and said test body in response to said electrical bias;

wherein one or more parameters of said modulated electrical bias and of said modulated optical radiation are selected to set a magnitude and direction of a charge transfer rate between said test body and said reference body;

wherein said parameters include a phase relation between said electrical bias and said optical radiation.

10. The system of claim 9, wherein a ratio of a maximum charge transfer rate magnitude to a minimum non-zero charge transfer rate magnitude is greater than about 10,000.

11. The system of claim 9, wherein said modulation parameters further include one or more parameters selected from the group consisting of: optical radiation duty cycle, electrical bias duty cycle, optical radiation modulation amplitude, electrical bias modulation amplitude, optical radiation amplitude, electrical bias amplitude, optical radiation pulse width, electrical bias pulse width, optical radiation modulation waveform, and electrical bias modulation waveform.

12. The system of claim 9, wherein said optical source comprises a substantially continuous-wave source in combination with a modulator.

13. The system of claim 9, wherein said optical source is directly modulated.

14. The system of claim 9, wherein said optical source comprises a source of ultraviolet radiation selected from the group consisting of: gas discharge lamps, light emitting diodes, laser diodes, lasers, super-fluorescent sources, and sources including a nonlinear frequency conversion material.

15. The system of claim 9, wherein said test body comprises a proof mass for a space based gravitational wave sensor.

16. The system of claim 15, wherein said modulation frequency is not within an instrumentation bandwidth of said gravitational wave sensor.

17. The system of claim 9, wherein said electrical bias and said optical radiation are modulated at substantially the same modulation frequency.

18. The system of claim 9, wherein said charged particles comprise electrons, and wherein emission of said electrons from said illuminated surfaces of said reference body and said test body is via the photoelectric effect.

* * * * *